UNITED STATES PATENT OFFICE.

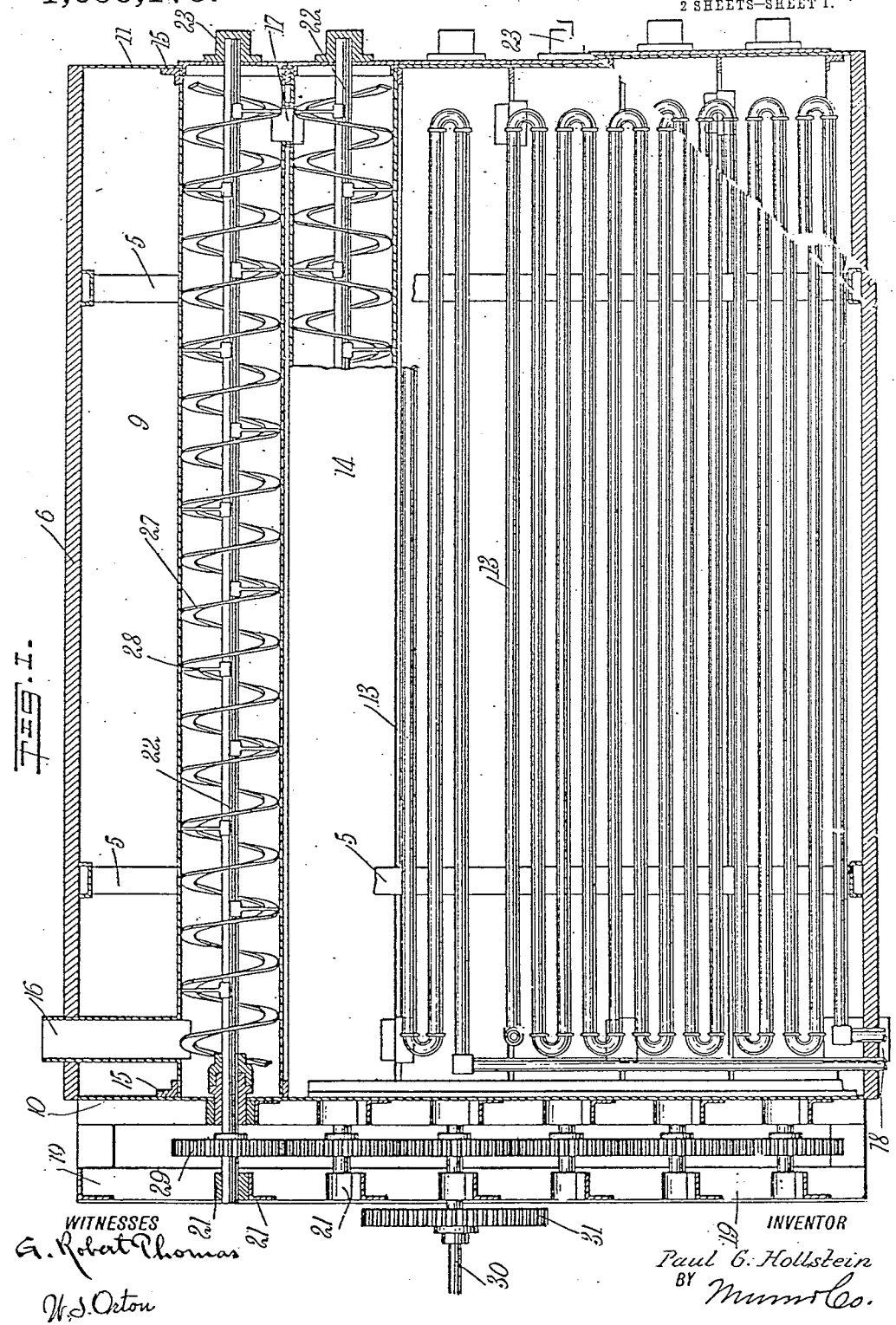

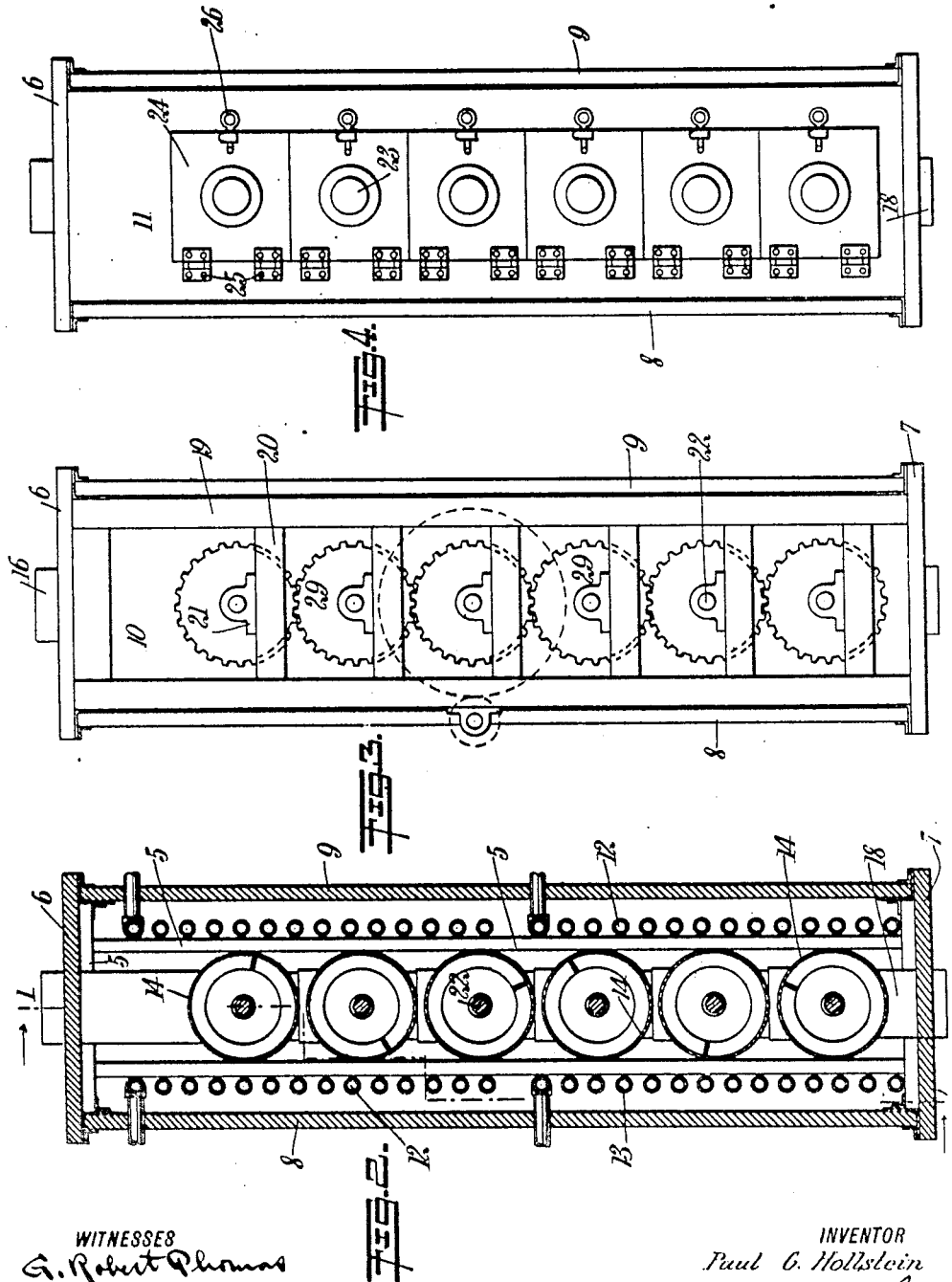

PAUL G. HOLLSTEIN, OF CARLSTADT, NEW JERSEY.

PULVERIZED-COCOA ROASTER.

1,055,175.   Specification of Letters Patent.   Patented Mar. 4, 1913.

Application filed February 1, 1912. Serial No. 674,705.

*To all whom it may concern:*

Be it known that I, PAUL G. HOLLSTEIN, a subject of the German Emperor, and a resident of Carlstadt, in the county of Bergen and State of New Jersey, have invented a new and Improved Pulverized-Cocoa Roaster, of which the following is a full, clear, and exact description.

In the art of preparing pulverized cocoa for commerce, it is desirable to extract a large proportion of the cocoa-butter and yet leave a sufficient amount of the latter to give the pulverized cocoa a pleasing reddish brown color in place of a steel gray color which the cocoa would assume after a considerable proportion of the cocoa-butter had been extracted. I attain the desired brown coloration of the cocoa, by slowly passing the same through the improved form of roaster forming the subject-matter of this application.

An object of my invention is to slowly feed the cocoa into the roaster, while subjecting the same to a moderate degree of heat, which, however, can be increased or decreased as the nature of the article may require.

The invention resides in the specific construction and arrangement of parts, all as more fully hereinafter set forth.

Reference is to be had to the accompanying drawings forming a part of this specification, in which similar characters of reference indicate corresponding parts in all of the figures, and in which—

Figure 1 is a side elevation of my improved device, taken on the irregular line 1—1 of Fig. 2, and looking in the direction of the arrow; Fig. 2 is a vertical transverse sectional view taken centrally through Fig. 1; Fig. 3 is an end elevation, looking at the left-hand side of Fig. 1, and Fig. 4 is an end elevation of the right-hand side of the machine shown in Fig. 1.

Described more in detail, I have shown a vertical rectangular framework 5, supporting a top plate 6 and positioned on a bottom plate 7, said bottom and top plates being connected by side walls 8 and 9, spaced outwardly from the vertical members of the framework 5, and preferably in the form of mineral wool panels. The ends of the structure thus formed are closed by means of metallic end plates 10 and 11.

Positioned within the roaster, between the vertical members of the framework 5 and the side walls 8 and 9, are heating members 12 supported by the vertical members of the framework, and in this instance, shown to be stem pipes 13 arranged in two superimposed batteries on each side of said framework. Disposed between the vertical members of the framework 5, is a series of parallel, superimposed metallic cylinders 14, said cylinders having their opposite ends suitably fastened to the end plates or side walls 10 and 11, as, for instance, by means of rings 15.

The material is fed into the upper cylinder by means of a chute 16, and is conveyed through said cylinder, by means hereinafter described, and ejected from the same through an opening 17. It is then fed in the reverse direction through the next succeeding cylinder, and so on through one cylinder after the other in succession until it is withdrawn through a chute 18 from the last cylinder.

Spaced outwardly from one end of the roaster, is a journal frame 19. This frame 19 has a series of transversely and horizontally disposed bars 20, one for each of the cylinders 14, each of which bars has centrally mounted on the upper edge thereof, a suitable form of journal block 21, in which is revolubly mounted one end of a shaft 22, disposed axially in the cylinders 14; the opposite end of the shaft 22 being mounted in journal boxes 23 carried by a door 24 hinged to the end plate 11 by means of leaf hinges 25, which door is fastened in place by a suitable catch 26. By this arrangement, it will be seen that the shafts 22 may be readily dismounted by opening the doors 24. Each of the shafts 22 has rigidly positioned thereon, within the cylinders 14, a spiral conveyer 27, in the form of a cylinder and of a diameter substantially equal to the internal diameter of the cylinders 14. The width of the blade of this conveyer is relatively small compared with the radius of the cylinder, forming a central open core about the shaft 22. The conveyer 27 is braced on the shaft and connected thereto by means of brace rods 28.

As hereinbefore described, it is necessary to rotate the succeeding conveyers in opposite directions, and that action is obtained by suitable gearing 29, mounted on the shafts exteriorly of the end plate 10, and, preferably, between said plate and the frame 19. This gearing may be driven from a power shaft 30 or power gear wheel 31.

Having thus described my invention, I claim as new and desire to secure by Letters Patent:

1. In a cocoa roaster, a cylinder having a shaft rotatably mounted therein, plates arranged at each end of said cylinder, a door hinged to one of said end plates, and a journal block carried by said door adapted to contain one end of said shaft.

2. A roaster for pulverized cocoa comprising a plurality of cylinders, means for stirring and feeding the matter placed in the cylinders, independent heating means placed on each side of said cylinders, a metallic housing for the cylinders and the heating means formed with a top, bottom, and ends, and a pair of removable sides formed of fire-resisting fiber, said heating means being arranged in said housing adjacent said sides and in proximity to the cylinders whereby the cylinders will receive a maximum heat and the metallic portion of the housing will receive a minimum amount of heat.

3. A cocoa drier comprising a housing, a plurality of independent doors arranged at one end of the housing, a plurality of horizontally arranged cylinders mounted in said housing with one end supported by said doors, there being one door for each cylinder, means for stirring and moving material placed in the cylinders, means arranged at each side of the cylinders for heating the same, and a framework for bracing the housing.

In testimony whereof I have signed my name to this specification in the presence of two subscribing witnesses.

PAUL G. HOLLSTEIN.

Witnesses:
W. S. ORTON,
PHILIP D. ROLLHAUS.

Copies of this patent may be obtained for five cents each, by addressing the "Commissioner of Patents, Washington, D. C."